United States Patent [19]

Jensen et al.

[11] Patent Number: 5,004,387
[45] Date of Patent: Apr. 2, 1991

[54] ROLLOUT STOP

[75] Inventors: Tom M. Jensen, Kirkland; Thomas H. Shorey, Mill Creek, both of Wash.

[73] Assignee: The Boeing Company, Seattle, Wash.

[21] Appl. No.: 438,604

[22] Filed: Nov. 17, 1989

[51] Int. Cl.⁵ .............................................. B60P 1/64
[52] U.S. Cl. ......................................... 410/69; 410/94
[58] Field of Search ...................... 410/69, 77, 78, 79, 410/94; 414/497, 529, 530

[56] References Cited

U.S. PATENT DOCUMENTS

| | | |
|---|---|---|
| Re. 20,157 | 11/1936 | Goodman . |
| 220,624 | 10/1879 | Jorgensen . |
| 427,647 | 5/1890 | Webb . |
| 1,377,396 | 5/1921 | Castleberry . |
| 1,699,168 | 1/1929 | Tilberg . |
| 3,299,572 | 1/1967 | Wallace . |
| 3,478,467 | 11/1969 | May . |
| 3,778,012 | 12/1973 | Fernandez ............................. 410/69 |
| 3,933,101 | 1/1976 | Blas ....................................... 410/69 |
| 4,026,069 | 5/1977 | Bohnett . |
| 4,134,345 | 1/1979 | Baldwin et al. . |
| 4,388,030 | 6/1983 | Skaale .................................. 410/69 |
| 4,583,896 | 4/1986 | Vogg et al. ........................... 410/69 |
| 4,626,155 | 12/1986 | Hlinsky et al. ................... 410/69 X |
| 4,696,609 | 9/1987 | Cole ....................................... 410/69 |

Primary Examiner—Frank E. Werner
Assistant Examiner—James T. Eller, Jr.
Attorney, Agent, or Firm—Christensen, O'Connor, Johnson & Kindness

[57] ABSTRACT

A stop assembly allowing a body to pass over it in a forward direction but obstructing passage in the opposite backward direction. The rollout stop assembly (10) includes a frame (18) and a pair of stops (20) mounted therein. Each stop includes a camming surface (30) which causes the stop to rotate downwardly into the frame upon engagement by the forward moving body (16), thereby allowing passage. Each stop also includes an abutment surface (32) engagable with the passed body that prevents backward movement of the body.

15 Claims, 5 Drawing Sheets

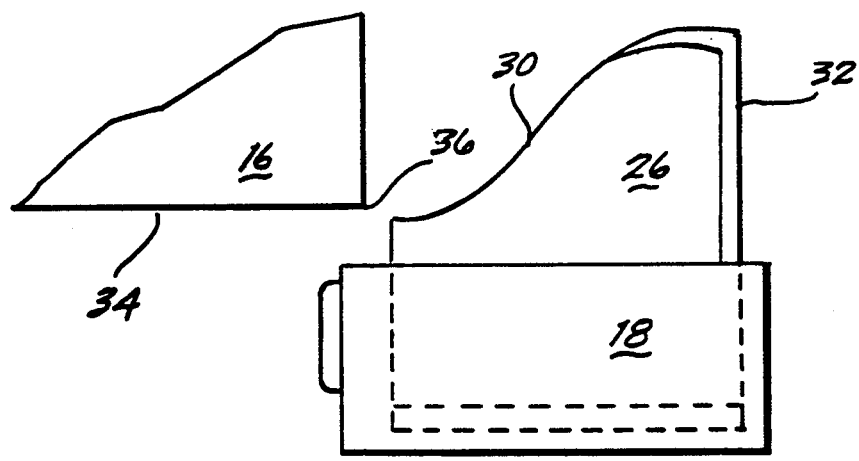
Fig. 4.
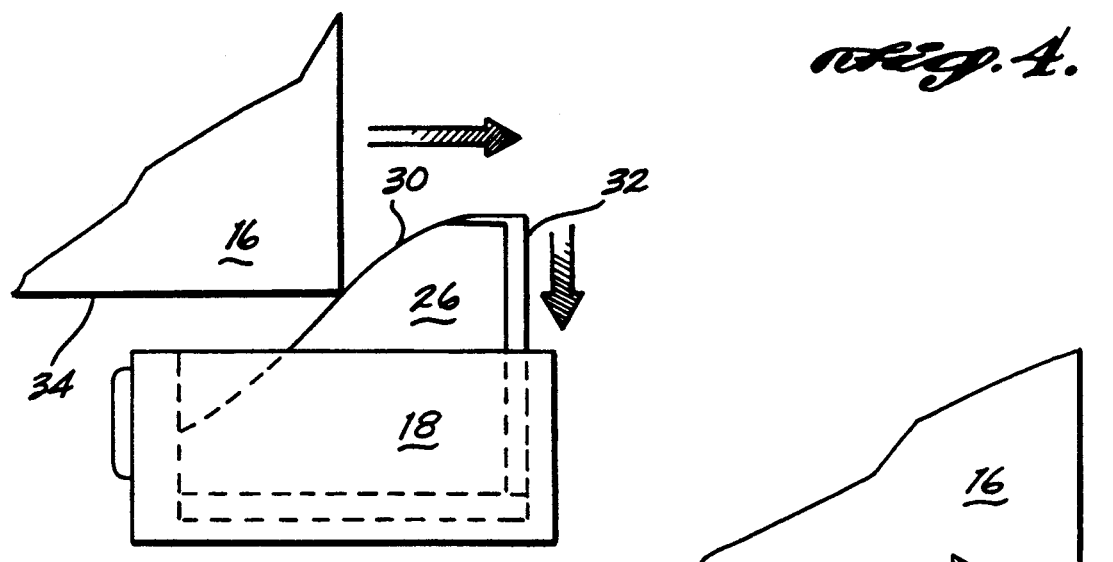
Fig. 5.
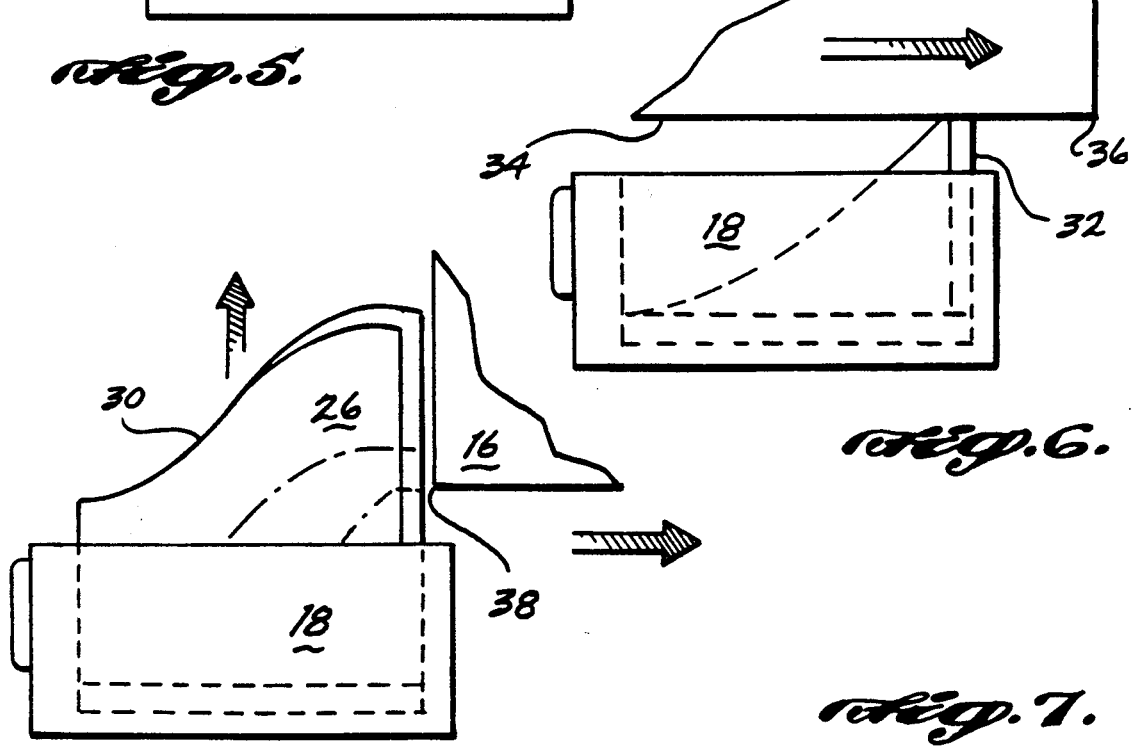
Fig. 6.
Fig. 7.

ROLLOUT STOP

TECHNICAL FIELD

This invention relates to one-way gate assemblies and, more specifically, to stop assemblies particularly useful in a loading door of an airplane.

BACKGROUND OF THE INVENTION

In many airplanes, cargo is loaded not only through the nose section of the airplane but through a side cargo door as well. In order to keep loaded cargo inside the airplane until it can be secured to the main cargo deck, it is common practice to employ stop assemblies near the sill of the side cargo door. In essence, the stop assemblies are one-way gate assemblies that allow cargo to pass in the inboard direction but obstruct passage in the outboard direction after the cargo has cleared the stop assembly.

Current stop assemblies consist of a contacting surface, usually a plate, connected through a complex linkage to a separate stop having an abutment surface. When such stop assemblies are in their normal nonengaged status, both the contacting surface and the separate stop are in upright positions. As cargo is rolled over the stop assembly in an outboard to inboard direction, the leading edge of the cargo engages the contacting surface, which begins to collapse to a position below the bottom of the cargo. Acting through the complex linkage, collapse of the contacting surface also causes collapse of the stop. Such stop assemblies are spring loaded, so that after the cargo has passed to a position inboard of the stop assembly, the contacting surface and the stop return to their normal upright positions. The abutment surface of the stop then acts to prevent backward outboard movement of the cargo.

Because of the great number, and sophistication, of the parts used in the complex linkage of current stop assemblies, they are expensive to produce. Due to the intricacy of the parts in the complex linkage, it is common for the linkage to break after a period of sustained impact to the abutment surface by airline cargo containers and pallets. Repair of such linkage is also quite expensive.

Another problem incident to current stop assemblies is that the stop containing the abutment surface may be inadvertently knocked down after the cargo has passed the stop assembly to an inboard position. This occurs because it is common for cargo containers and pallets to warp upwardly about their periphery after extended use. Because the contacting surface of current stop assemblies has a higher elevation than the stop containing the abutment surface, when warped containers and pallets move in an outboard direction, as they may do on occasion, their upwardly warped leading edge can pass above the abutment surface of the stop and engage the contacting surface. This causes the stop to collapse and allow free outboard movement of the container or pallet, thereby eliminating the entire function of the stop assembly.

Yet another problem incident to current stop assemblies is that they are easily stolen due to the quick-release manner in which they are attached to the main cargo deck of the airplane. This is a particular problem in some of the less secure airports in underdeveloped countries of the world. Given the expensive nature of current stop assemblies, and their nearly uniform use throughout the industry, black markets for such stop assemblies have developed in various pockets of the world.

As a result of the reasons detailed above, there has been a long-felt need for a stop mechanism applicable to the side loading door of cargo airplanes that is relatively inexpensive to produce, that has an abutment surface and general design capable of withstanding sustained impact loads, that circumvents the warped container and pallet problem, and that attaches to existing fittings in a manner that reduces the possibility of theft. This invention is directed to satisfying this need.

SUMMARY OF THE INVENTION

In accordance with this invention, a stop assembly allowing a body to pass over it in one direction but obstructing passage in the opposite direction is disclosed. The stop assembly includes a frame and a stop rotatably mounted in the frame. The stop includes a vane that normally extends upwardly into the path of movement of the body. The vane has a camming surface that, when engaged by the body, causes the vane to rotate into the frame, and thereby out of the path of the body. The vane also has an abutment surface that is engagable with the body after the body has passed beyond the vane and the vane has been rotated back by a biasing mechanism to its normal upright position to prevent backward movement of the body.

BRIEF DESCRIPTION OF THE DRAWINGS

The foregoing and other features and advantages of the present invention will become more readily appreciated as the same becomes better understood by reference to the following detailed description of an embodiment of the invention and the accompanying drawings wherein:

FIG. 4 is a schematic side view showing the orientation of the rollout stop just prior to engagement by the leading edge of a cargo container or pallet;

FIG. 5 is a schematic side view showing the orientation of the rollout stop after the leading edge of the cargo container or pallet has moved to the central region of the rollout stop;

FIG. 6 is a schematic side view showing the orientation of the rollout stop after the leading edge of the cargo container or pallet has passed beyond the inboard boundary of the rollout stop;

FIG. 7 is a schematic side view showing the orientation of the rollout stop after the trailing edge of the cargo container or pallet has passed beyond the inboard boundary of the rollout stop;

DETAILED DESCRIPTION OF THE PREFERRED EMBODIMENT

Figure 1:
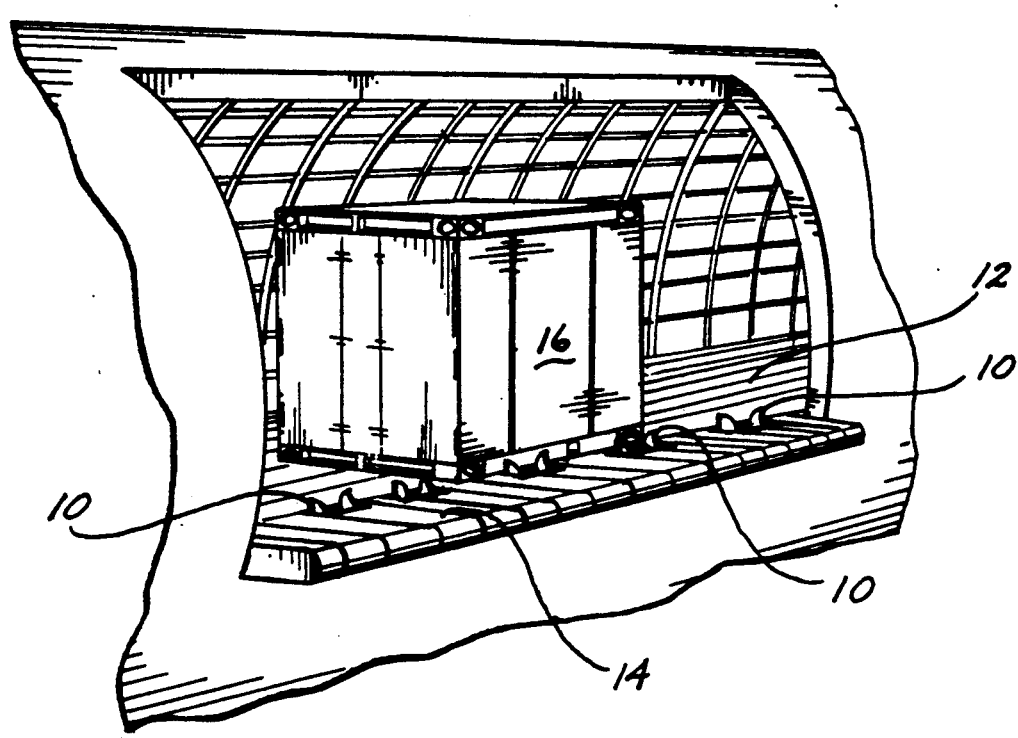
FIG. 1 is an environmental perspective view of a side door area of an airplane utilizing rollout stops made in accordance with the principles of the present invention.

As illustrated in FIG. 1, a series of rollout stop assemblies 10 formed in accordance with the present invention may be employed in the main cargo deck 12 of a cargo airplane, just inboard of the opening to the side cargo door. For cargo airplanes utilizing a short, built-in loading platform 14, the rollout stop assemblies 10 are situated at the junction of the main cargo deck 12 and the loading platform 14. During flight, the loading platform 14 has been pivoted upward and rests just inboard of the side cargo door. The function of the rollout stop assemblies 10 is to allow a cargo body 16, normally a loaded cargo container or cargo pallet, to pass over the rollout stop assemblies 10 in the inboard direction during the loading operation, but to obstruct passage of the cargo body 16 in the opposite direction to prevent it from rolling back out through the side cargo door.

Figure 2:
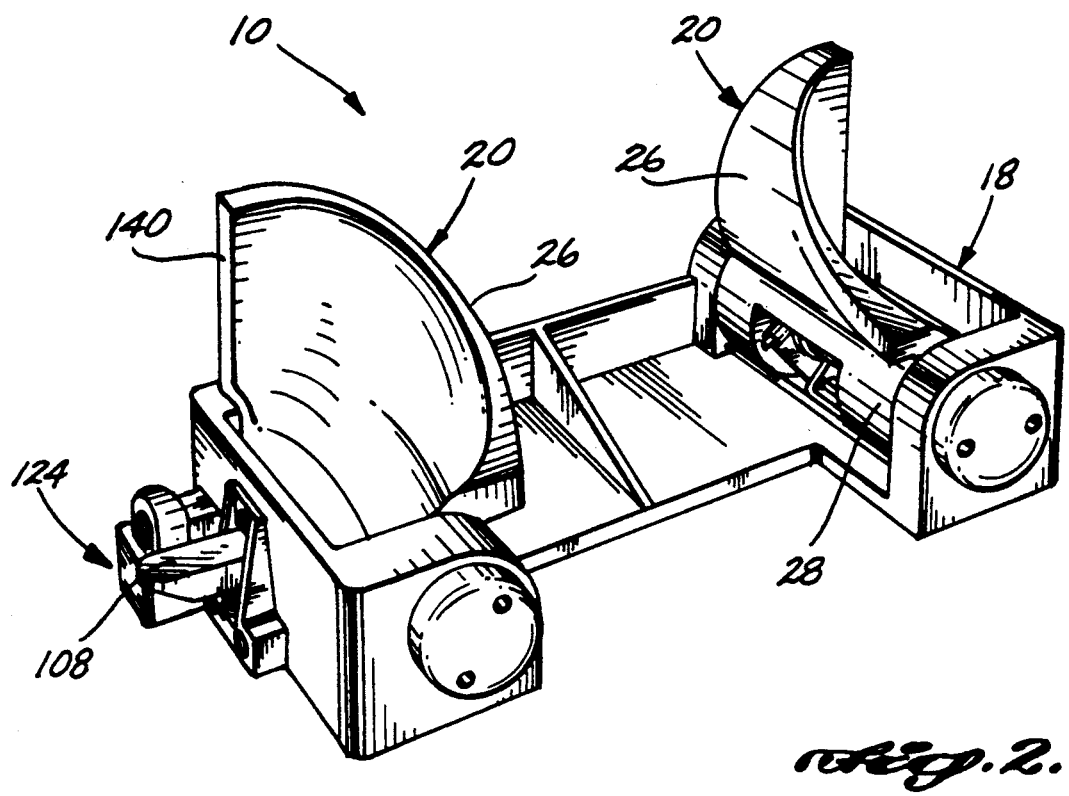
FIG. 2 is a perspective view of the rollout stop of the present invention, viewed from its outboard side.
Figure 3:
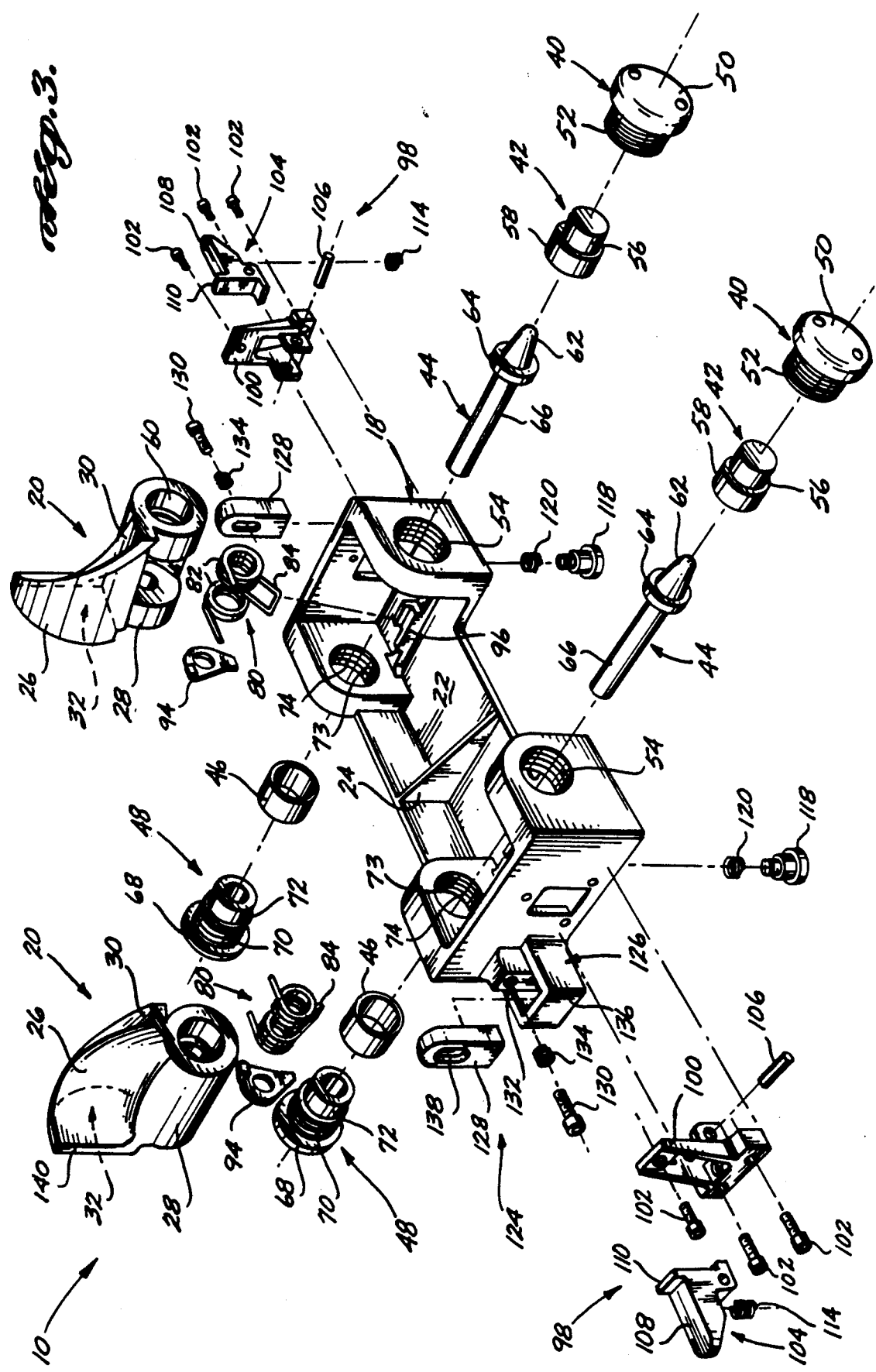
FIG. 3 is an exploded view of the rollout stop shown in FIG. 2.

FIGS. 2 and 3 illustrate an embodiment of the rollout stop assembly 10, generally including a frame 18 and a pair of stops 20 rotatably mounted in the frame 18. Each stop 20 normally extends upwardly into the path of movement of the cargo body 16 until engagement by the cargo body 16 causes stop 20 to rotate downwardly into the frame 18, thereby allowing the cargo body 16 to pass to an inboard position. The rollout stop assembly 10 also includes a mechanism for rotating each stop 20 back to its normal upwardly extending position after cargo body 16 has passed, thereby serving as an impediment to outboard movement of the cargo body 16.

The frame 18 is of a generally rectangular shape, having a solid base 22 and an open top. Frame 18 is designed to be attached to the main cargo deck 12, near the sill of the side cargo door, in a manner more fully described below. To reduce the weight of the rollout stop assembly 10, the base 22 of the frame 18 may be cut back on the outboard side. For structural integrity in the central portion of the frame 18, a structural reinforcement 24 is added. Of course, these are matters of design detail and may be varied.

In the embodiment illustrated, two stops 20 are employed, one at each end of the frame 18. Each stop 20 includes a vane 26 structurally integral with a cylindrical hub 28. While it is possible that the vane 26 and the hub 28 be separate parts connected by conventional methods, a more structurally sound stop 20 occurs if they are cast as a single piece. When the stop 20 is in a nonengaged condition, the vane 26 normally extends upwardly into the path of movement of the cargo body 16. The vane 26 has a camming surface 30 that is engagable with the cargo body 16, causing the vane 26 and hub 28 to rotate downwardly into the frame 18 and out of the path of the cargo body 16 upon engagement. The vane 26 also includes a flat abutment surface 32 on its inboard side, extending at a right angle to the axis of rotation of the hub 28. As will be described hereafter, the abutment surface 32 prevents backward movement of the cargo body 16 once it has passed rollout stop assembly 10 to an inboard position.

To achieve the desired rotation of the stop 20 the camming surface 30 slopes upwardly from the outboard end of the hub 28 to the top of the abutment surface 32 at the inboard end of the hub 28. Additionally, the camming surface 30 curves from the outboard end of the hub 28 in a direction opposite to the desired rotation of the vane 26 of the stop 20. For example, the stop 20 on the left in FIGS. 2 and 3, when viewed from an outboard position, should rotate in a clockwise direction. This allows the vane 26 to rotate down and into the frame 18 to a position below the advancing rolling cargo body 16. Thus, as illustrated, it is required that the camming surface 30 curve in a counterclockwise direction to provide the desired rotation of stop 20. The combination of slop and curve causes the camming surface 30 to sweep out an arc from the inboard end to the outboard end of the hub 28.

Rotation of the vane 26 upon engagemetn by the cargo body 16 is best understood by reference to FIGS. 4, 5, 6, and 7. The cargo body 16 has a bottom surface 34, which rides along a roller plane defined by rollers and/or casters placed in loading platform 14. Similar rollers and/or casters are placed in the main cargo deck 12 to facilitate the onboard positioning of the cargo body 16. As shown in FIG. 4, the portion of camming surface 30 located most outboard begins at an elevation below the leading edge 36 of the illustrated cargo body 16, leading edge 36 being defined by the point at which the bottom surface 34 meets the front wall.

As the cargo body 16 moves in an inboard direction, the leading edge 36 makes contact with the camming surface 30. As the cargo body 16 moves further inboard, the leading edge 36, acting upon the camming surface 30, causes the vane 26 to rotate downward into frame 18. The leading edge 36 continues to engage camming surface 30 until vane 26 is rotated to a position below the bottom surface 34 (refer to FIG. 6). When the trailing edge 38 of the cargo body 16 has passed to a position inboard of stop 20, vane 26 is free to be rotated back to its normal upright position which causes the abutment surface 32 to extend upwardly, thereby preventing backward outboard movement of the cargo body 16 over the rollout stop 10 (refer to FIG. 7).

The preferred manner of rotatably mounting the stop 20 to the frame 18 is best illustrated by reference to FIGS. 3 and 9. The axle, or shaft, mechanism that supports and allows the free rotation of hub 28 includes the combination of outboard cap 40, bushing 42, floating axle 44, bushing 46, and inboard cap 48.

Outboard cap 40 has a cylindrical head 50 and a hollow externally threaded cylindrical body 52 having a lesser diameter than head 50. The threaded cylindrical body 52 engages threads 54 formed in the outboard wall of the frame 18. The hollow portion 55 of the threaded cylindrical body 52 also has a smooth surface extending back to head 50 which is sized to receive the reduced portion 56 of cylindrical bushing 42. An expanded portion 58 of bushing 42 engages a sleeve 60 formed in the outboard end of hub 28 and remains static as sleeve 60 turns about it during the rotation of hub 28. The bushing 42 also has a conical recess formed in its central region that accommodates conical projection 62 of floating axle 44. Floating axle 44 also has a cylindrical ring portion 64 located immediately inboard of conical projection 62. The ring portion 64 of floating axle 44 rests against the inboard terminus of sleeve 60 formed in the outboard end of hub 28. The remainder of floating axle 44 consists of a shaft 66 that projects in an inboard direction through a correspondingly sized aperture in the hub 28.

Inboard cap 48 has a cylindrical head 68 and a partially threaded cylindrical body 70 of lesser diameter. The outboard end of the partially threaded cylindrical body 70 includes an unthreaded extension 72, of even lesser diameter, sized to receive the inner surface of the bushing 46. The inboard wall of the frame 18 contains threads 73 engaging the partially threaded cylindrical body 70, and contains a recess port 74 located immediately inboard of the threads 73. The recess port 74 accommodates the head 68 of inboard cap 48, such that inboard cap 48 does not project in a direction inboard beyond the inboard surface of the frame 18. The central region of inboard cap 48 also includes a bore 75 sized to receive the end of the shaft 66 of floating axle 44 located distal from conical projection 62 and ring portion 64. The terminal end of shaft 66 stops just short of the terminus of the bore 75.

Bushing 46 is sized so that its outer surface will tightly engage a sleeve 76 formed in the inboard end of the hub 28. Conversely, the inner surface of the bushing 46 merely loosely engages the unthreaded extension 72 of inboard cap 48. As a result, the bushing 46 rotates in unison with the hub 28, while the unthreaded extension 72 remains static.

Figure 9:
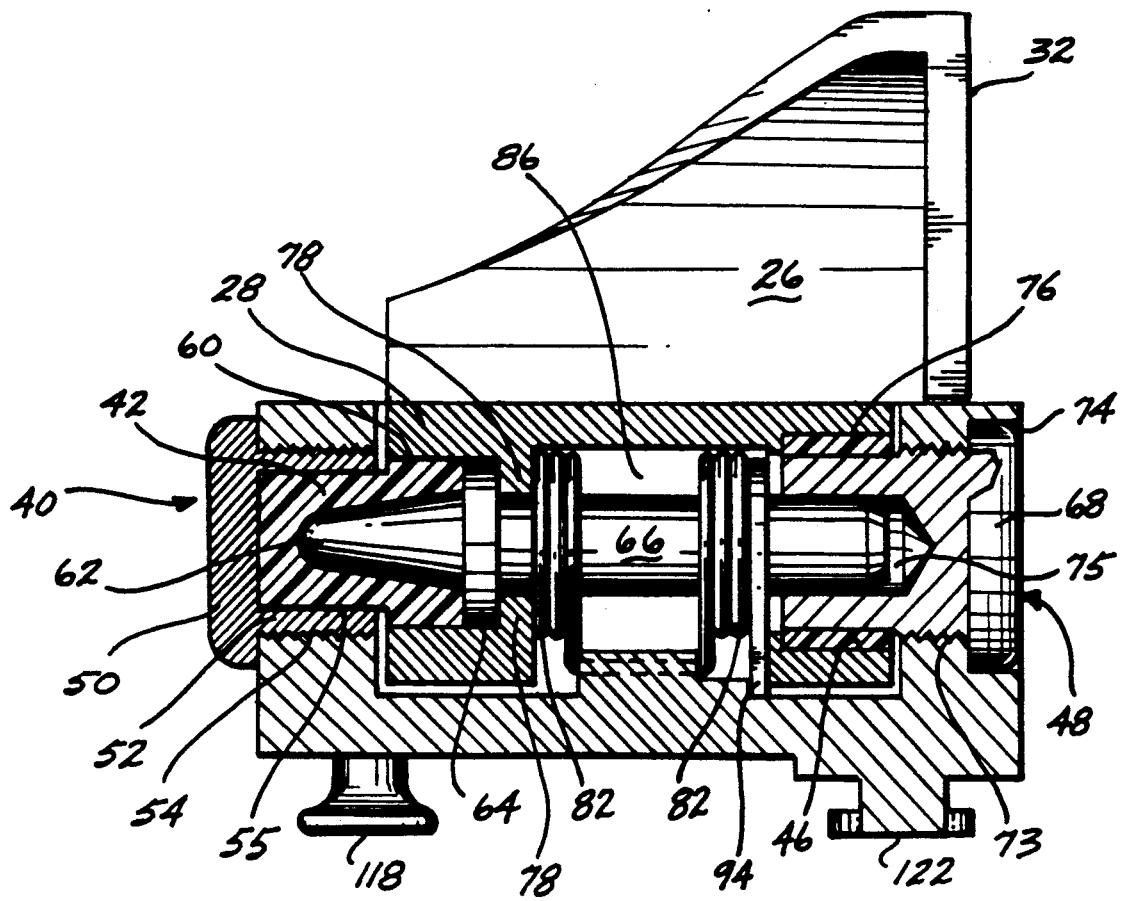
FIG. 9 is a cross-sectional elevational side view of the rollout stop taken through the center and along the length of a hub.
Figure 10:
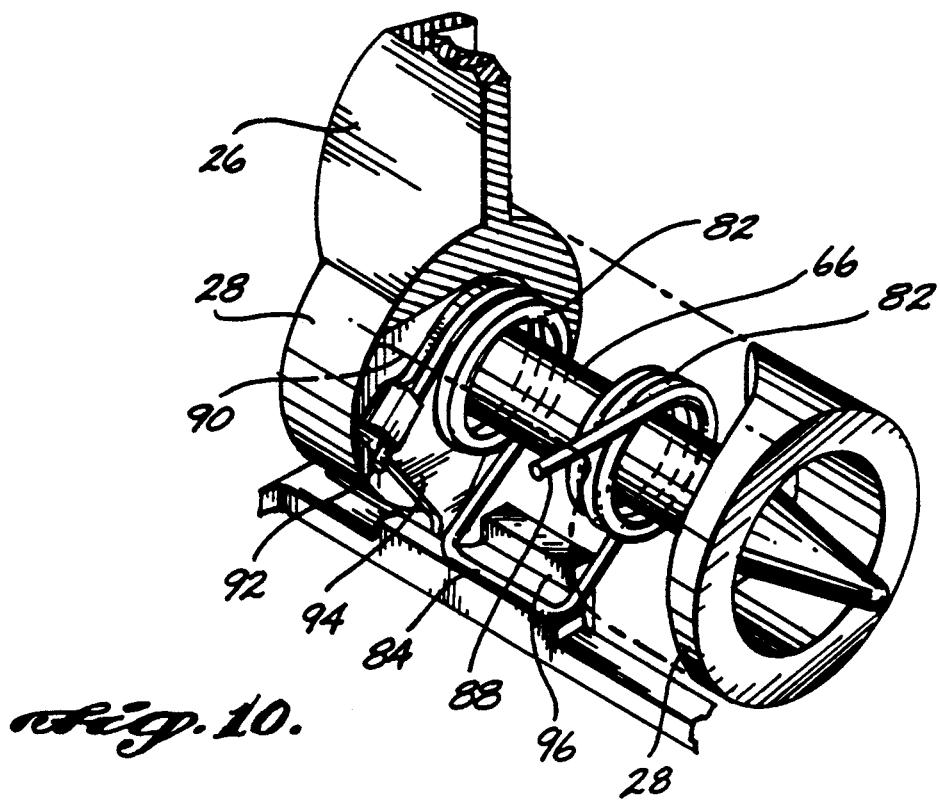
FIG. 10 is a partially cutaway isometric view of the central hub region of the rollout stop.

The configuration of the floating axle 44 and bushing 42, coupled with the material of composition of bushing 42, provide a shock-absorbing property to the rollout stop assembly 10 (refer to FIG. 9). When the cargo body 16, usually of significant weight, moves backward against abutment surface 32, a significant impact load is imparted to the rollout stop assembly 10. The configuration of the present invention allows the force exerted by this impact load to be transferred through the vane 26 and the hub 28 into bushing 42. In particular, the force is transferred to the bushing 42 via a collar 78 of the hub 28 located immediately inboard of the ring portion 64 of floating axle 44. The conical projection 62 engages the conical recess of bushing 42, and helps to more evenly distribute the force throughout the bushing 42.

The preferred material of composition for bushing 42 is an acetal resin, which is a polyoxymethylene thermoplastic polymer exhibiting moderate hardness, rigidity, and resilience. Acetal resins are dimensionally stable under exposure to moisture and heat, are resistant to chemicals and solvents, are resistant to flexing and creep, and have a low friction surface. These properties make acetal resins ideal as materials of composition for bushings. The very slight elastomeric nature, or give, incident to acetal resins makes them particularly well suited as a bushing that must also play a shock-absorbing role, as the bushing 42 of the present invention must do. However, it will be appreciated by those skilled in the art that other materials of composition exemplifying some or all of these characteristics may also be used. Commercially available forms of acetal resins contemplated for use in the manufacture of the bushing 42 include acetal resins marketed under the trade name DELRIN, produced by E. I. duPont de Nemours and Company of Wilmington, Del., and under the trade name CELCON, produced by Celanese Chemical Company of New York, N.Y.

The mechanism that holds the vane 26 in its normal upwardly extending position, that provides resistance as the vane 26 is rotated down into the frame 18 upon engagement by the cargo body 16, and that rotates the vane 26 back to its normal upright position after passage of the cargo body 16 is best illustrated in FIGS. 3, 9, 10, and 11. A double acting spring 80, having two spaced-apart coils 82 joined by intermediate link 84, provides the necessary biasing action. The coils 82 of the double acting spring 80 are positioned around the shaft 66 of the floating axle 44 in a cutaway portion 86 of the hub 28, intermediate its inboard and outboard ends. The double acting spring 80 has a first free end 88 that engages a first, or upper, horizontally extending edge 90 of the cutaway portion 86, while a second free end 92 is rotated downward, preferably approximately thirty degrees, and held in that position by a spring actuator 94. Both the spring actuator 94 and the intermediate link 84 of double acting spring 80 engage a support 96 on the base 22 of frame 18. It is this engagement and the action of double acting spring 80 that keeps the spring actuator 94 in place.

Because the second free end 92 of the double acting spring 80 is captured in a downwardly rotated position by the spring actuator 94, the first free end 88 exerts an upward force on the first horizontally extending edge 90 of cutaway portion 86, thereby biasing the vane 26 into its normal upright position. As the camming surface 30 of the vane 26 is first engaged by a cargo body 16, the first horizontally extending edge 90 of cutaway portion 86 rotates downwardly against the first free end 88 of double acting spring 80. This provides a slight amount of resistance to further rotation of the vane 26, but it is relatively negligible in comparison to the force exerted by the inboard moving cargo body 16. As the vane 26, and correspondingly the first horizontally extending edge 90, have rotated through thirty degrees, the spring actuator 94 and the second free end 92 of double acting spring 80 are encountered by the first horizontally extending edge 90. As a result, the resistance to downward rotation of the vane 26 is doubled. The double action concept is desirable because it is advantageous that a lesser amount of resistance be encountered by vane 26 upon initial engagement by the leading edge 36 of the cargo body 16, so as not to impede movement of the cargo body 16.

When the vane 26 of stop 20 has rotated downwardly into the frame 18 to a position below the roller plane of cargo body 16, the resistance to rotation supplied by double acting spring 80 has reached its apex. As a result, there is more than ample force available to return the vane 26 to its normal upright position after the cargo body 16 has completely passed to a position inboard of the rollout stop assembly 10.

During the cargo unloading process, it is required that the stops 20 remain in a down locked position so that the cargo may be moved from an inboard to an outboard location. This function is achieved by a locking mechanism 98 associated with each stop 20, which is best understood by reference to FIGS. 2, 3, and 11. The locking mechanism 98 includes a bracket 100 fitting within an opening in the end walls of the frame 18 and mounted in place by screws 102. An actuator 104 is pivotably mounted within the bracket 100 by a pin 106, and has an actuation surface 108 extending outwardly from the outside surface of the end wall of frame 18. The actuator 104 also has a tab 110 extending upwardly from the actuation surface 108, the tab 110 residing just inside the inside surface of the end wall of frame 18. The bracket 100 contains a seat that is sized to receive a spring 114 which provides an upward bias to the actuator 104. This upward bias causes the tab 110 of the actuator 104 to be inwardly biased, thereby riding against the middle region of the hub 28.

Figure 11:
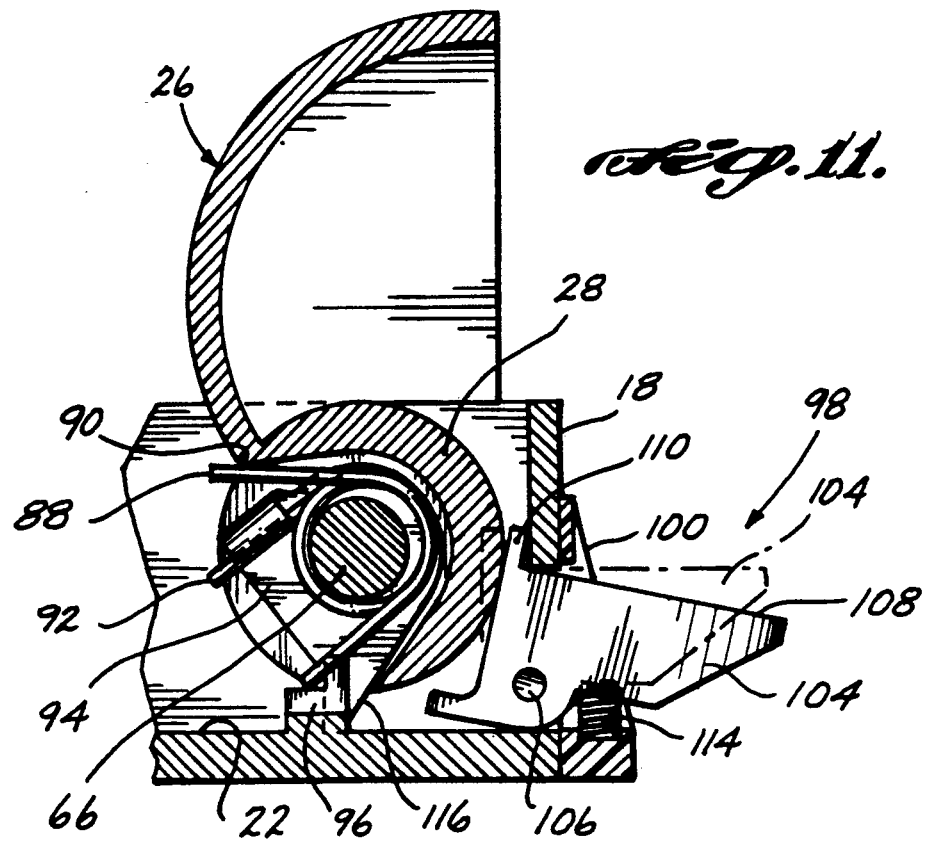
FIG. 11 is a cross-sectional end view showing the locking mechanism of the rollout stop.

As the vane 26, and correspondingly the hub 28, are completely rotated to a position beyond that incident to the rotation caused by the passage of the cargo body 16, the hub 28 is locked in a down position. This complete rotation of the vane 26 and the hub 28 may be manually performed by hand or foot. FIG. 11 shows that when complete rotation of the vane 26 and the hub 28 occurs, the inwardly biased tab 110 engages a second horizontally extending edge 116 of the cutaway portion 86 of the hub 28, thereby locking the hub 28 in a down position.

After unloading of the cargo is complete, it is desirable to unlock the hub 28 and return the rollout stop assembly 10 to its normal function. This is accomplished by depressing the actuation surface 108, preferably by foot, thereby pulling the tab 110 back out of engagement with the second horizontally extending edge 116. This allows the vane 26 to be returned to its normal upright position through the biasing action of double acting spring 80 (described above).

Figure 8:
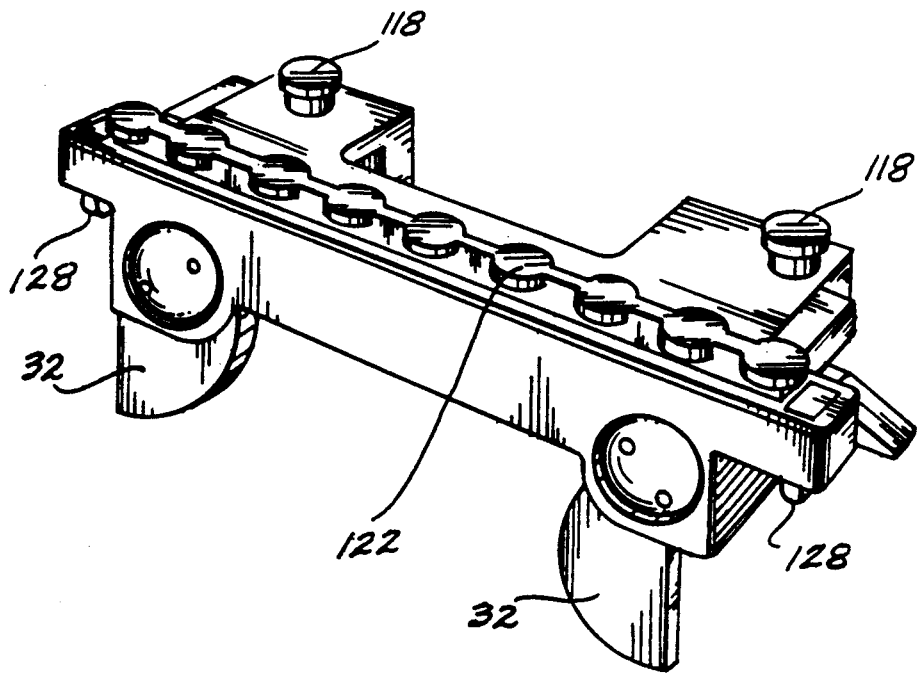
FIG. 8 is an inverted perspective view of the rollout stop shown in FIG. 2, illustrating one means of attaching the rollout stop to a cargo deck.

The rollout stop assembly 10 of the present invention may be attached to its working surface by a multitude of conventional methods. However, it is preferable that it be capable of attachment to the seat tracks currently being used to secure existing stops. Consequently, the rollout stop assembly 10 of the present invention has been so designed, as is illustrated in FIGS. 2, 3, and 8.

A pair of seat track studs 118 are located on opposite ends of the bottom of the base 22, on the outboard side of the frame 18. The seat track studs 118 are threaded on their upper ends to be received within double threaded inserts 120. The double threaded inserts 120 are in turn received within a threaded bore (not shown) in the bottom of the frame 18. The purpose of double threaded inserts 120 is to help preserve the integrity of the threads formed into the thread bore of the frame 18. The lower end of each seat track stud 118 is sized to be received within a seat track (not shown) located in the floor of the environment in which the rollout stop assembly 10 is to be used. In the particular environment to which the illustrated embodiment of the present invention is applied, the floor corresponds to the main cargo deck 12.

A contiguous row of seat track studs 122 is located on the bottom of the base 22, on the inboard side of the frame 18. The row of seat track studs 122 is sized to engage a seat track (not shown) located in the main cargo deck 12. The purpose behind using the contiguous row of seat track studs 122, as opposed to individual studs, is to more evenly distribute the high impact loads caused by the backward surging of the cargo body 16 against the abutment surface 32. In the past, individual seat track studs have either broken or destroyed the threaded bore in which they were attached after extended exposure to such impact loads. In contrast, the contiguous row of seat track studs 122 of the present invention provides a wider area over which the impact load is shared, and utilizes no threaded bores. As a result, the concern over breakage of seat track studs is greatly diminished, and the stripped bore concern is nonexistent. In order to provide an even more durable means of attachment, it is preferable that the contiguous row of seat track studs 122 be cast into the frame 18.

On each end wall of the frame 18, directly in line with the contiguous row of seat track studs 122, is located a seat track lock 124. The seat track lock 124 includes a receiving bracket 126, a slide bar 128, and a threaded bolt 130. The receiving bracket 126 is integral with the frame 18, preferably being cast as a one piece unit. The receiving bracket 126 has a threaded bore 132 sized to received a double threaded insert 134, which in turn is sized to receive the threaded bolt 130. As before, the double threaded insert 134 is employed to maintain the integrity of the threaded bore 132 formed in the receiving bracket 126. The receiving bracket 126 also includes a corral 136, sized to accommodate the vertical movement of slide bar 128 therein. Slide bar 128 has a vertical channel 138 passing through it, through which threaded bolt 130 extends. In this manner, slide bar 128 is held in place by threaded bolt 130, but is allowed vertical movement along the length of the vertical channel 138. This vertical movement allows slide bar 128 to slide downwardly below the level of the bottom of the base 22 of frame 18 to engage a seat track (not shown), thereby preventing translational movement of the rollout stop assembly 10 along the seat tracks (not shown). Slide bar 128 is of such a weight that gravitational forces will cause it to fall downwardly into engagement when properly aligned in the seat track.

The seat track lock 124 of the present invention includes an anti-theft feature not present in current stop assemblies. Because the vertical channel 138 of slide bar 128 is more narrow than the head of the threaded bolt 130, threaded bolt 130 may be tightened after the rollout stop assembly 10 is in place to a point where its head rests against the vertical channel 138. Consequently, vertical movement of slide bar 128 is prohibited. To ensure that a potential thief does not untighten threaded bolt 130 and abscond with the rollout stop assembly 10, a tool engaging recess of an unusual design, requiring a special wrench to turn it, is formed into the head of threaded bolt 130.

Because the separate contacting surface and stop found in current stop assemblies are combined in the present invention, the previously encountered problem of onboard warped containers and pallets inadvertently deactivating the stop assembly is no longer of concern. While the design of the present invention does potentially lend itself to deactivation should a skewed onboard container or pallet hit the outside surface 140 of the vane 26, the fact that there are two oppositely directed stops 20 overcomes this potential problem. Such a skewed container or pallet striking the outside surface 140 of the first stop 20 may cause it to rotate downwardly into the frame 18, but the outboard movement of the container or pallet would be prevented by the oppositely rotating second stop 20, or by a separate adjacently located rollout stop assembly 10.

While the rollout stop assembly 10 of the present invention has been illustrated with two oppositely directed stops 20, it will be appreciated that it is possible to utilize a single stop version of the same, or a combination of single stop and double stop assemblies. Obviously, such a single stop version would require adjustments to the general design of the frame, method of attachment, etc. Additionally, it is conceivable that more than two stops may be employed within a single frame. Should such a design be utilized, it would of course be advantageous to have adjacent stops rotate in opposite directions.

While a preferred embodiment of the present invention has been illustrated and described, it should be understood that variations could be made therein without departing from the spirit and scope of the invention. Accordingly, it is to be understood that the invention is not to be limited to the specific embodiment illustrated and described. Rather, the true scope and spirit of the invention is to be determined by reference to the following claims.

The embodiments of the invention in which an exclusive property or privilege is claimed are defined as follows:

1. A stop assembly allowing a body to pass over it in one direction but obstructing passage in the opposite direction, said stop assembly comprising:
   a frame;
   a stop rotatably mounted in said frame and having a vane normally extending upwardly into the path of movement of a body;
   said vane having a camming surface engagable with a first side of and the bottom of the body for causing said vane to rotate out of the path of the body upon engagement therewith, said vane rotating about an axis lying substantially parallel to the direction of movement of the body;
   means for rotating said vane back into the path of the body after the body has passed beyond the vane; and
   said vane having an abutment surface oriented substantially parallel to said first side of the body and engagable with the body after said vane has been rotated back to its normal upright position to prevent backward movement of the body.

2. The stop assembly of claim 1, wherein said stop further has a hub to which said vane is connected, and further comprising axle means mounted to said frame, said hub being rotatable about said axle means and said vane extending upwardly from said hub to its normal upright position when said vane is not engaged by the body.

3. The stop assembly of claim 2, wherein said abutment surface extends upwardly from one end of said hub and said camming surface slopes upwardly toward said abutment surface from the other end of said hub.

4. The stop assembly of claim 3, wherein said camming surface curves from one end of said hub to the other end of said hub in a direction opposite to the desired direction of rotation of said hub and vane.

5. The stop assembly of claim 2, wherein said means for rotating comprises:
   a cutaway portion of said hub intermediate its ends having a first horizontally extending edge and an opposing second horizontally extending edge;
   a spring support mounted on said frame beneath said cutaway portion; and
   a coil spring engaging said first horizontally extending edge of said cutaway portion and said spring support, whereby said hub is biased to urge said vane to its normal upright position.

6. The stop assembly of claim 5, further comprising locking means disposed within said frame engagable with said hub to lock said stop in a down position upon rotation of said stop into said frame below the bottom of the body, wherein said locking means comprises:
   a bracket mounted in said frame;
   an actuator pivotally mounted to said bracket, said actuator having an upwardly extending tab located immediately inside said frame and adjacent said hub;
   a spring in cooperative engagement with said actuator, said spring biasing said tab of said actuator inwardly against said hub; and
   said tab of said actuator moving to a position of locking engagement with said second horizontally extending edge of said cutaway portion of said hub upon rotation of said stop into said frame below the bottom of the body to lock said stop in its down position.

7. The stop assembly of claim 6, wherein said actuator has an actuation surface extending outside said frame, depression of said actuation surface pulling said tab out of locking engagement with said second horizontally extending edge and thereby releasing said hub from its locked down position.

8. The stop assembly of claim 2, further comprising locking means disposed within said frame engagable with said hub to lock said stop in a down position upon rotation of said stop into said frame below the bottom of the body.

9. The stop assembly of claim 2, further comprising a shock-absorbing bushing mounted to said axle means in cooperative engagement with said hub such that backward force exerted upon said abutment surface by the body is transferred from said abutment surface through said hub and is absorbed by said shock-absorbing bushing.

10. The stop assembly of claim 9, further comprising a floating axle mounted between said hub and said shock-absorbing bushing to facilitate the transfer of force, said floating axle having a ring portion engaging said hub and said shock-absorbing bushing and having a conical projection extending from said ring portion into a recess of corresponding shape formed in said shock-absorbing bushing.

11. The stop assembly of claim 9, wherein said shock-absorbing bushing is composed of an acetal resin.

12. The stop assembly of claim 1, further comprising fastening means having at least one seat track stud located on the bottom of said frame engagable with a seat track located in the floor of the environment in which said stop assembly is to be used.

13. The stop assembly of claim 12, wherein said fastening means is comprised of:
   a pair of seat track studs located on opposite ends of the bottom of said frame engagable with a first seat track located in the floor of the environment in which said stop assembly is to be used;
   a contiguous row of seat track studs located adjacent said abutment surface and opposite said pair of seat track studs on the bottom of said frame engagable with a second seat track located in the floor of the environment in which said stop assembly is to be used; and
   at least one seat track lock located on the end of said frame directly in line with said contiguous row of seat track studs that engages said second seat track to prevent translational movement of said stop assembly along said first and second seat tracks.

14. The stop assembly of claim 1, further comprising a second stop rotatably mounted in said frame, each of said stops being disposed at opposite ends of said frame and rotating in opposite directions toward each other.

15. The stop assembly of claim 1, further comprising a plurality of stops rotatably mounted in said frame.

* * * * *

UNITED STATES PATENT AND TRADEMARK OFFICE
CERTIFICATE OF CORRECTION

PATENT NO. : 5,004,387
DATED : April 2, 1991
INVENTOR(S) : Tom M. Jensen et al.

It is certified that error appears in the above-identified patent and that said Letters Patent is hereby corrected as shown below:

| COLUMN | LINE | |
|---|---|---|
| 4 | 7 | Delete "slop" and insert therefor --slope-- |

Signed and Sealed this

Twelfth Day of January, 1993

Attest:

DOUGLAS B. COMER

*Attesting Officer*     *Acting Commissioner of Patents and Trademarks*